(12) United States Patent
Yasuda et al.

(10) Patent No.: US 10,416,363 B2
(45) Date of Patent: Sep. 17, 2019

(54) RESIN MOLDING

(71) Applicant: SEIKOH GIKEN CO., LTD., Chiba (JP)

(72) Inventors: Takashi Yasuda, Chiba (JP); Masahide Hioki, Chiba (JP); Norihiro Kakinuma, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 0 days.

(21) Appl. No.: 15/736,283

(22) PCT Filed: Dec. 8, 2016

(86) PCT No.: PCT/JP2016/086472
§ 371 (c)(1),
(2) Date: Dec. 13, 2017

(87) PCT Pub. No.: WO2017/099157
PCT Pub. Date: Jun. 15, 2017

(65) Prior Publication Data
US 2018/0180781 A1    Jun. 28, 2018

(30) Foreign Application Priority Data

Dec. 10, 2015 (JP) .................. 2015-241654

(51) Int. Cl.
*G02B 5/18* (2006.01)
*B44F 1/04* (2006.01)
(Continued)

(52) U.S. Cl.
CPC ............. *G02B 5/1861* (2013.01); *B44F 1/04* (2013.01); *B44F 9/10* (2013.01); *G02B 5/045* (2013.01); *B44C 5/0453* (2013.01)

(58) Field of Classification Search
CPC ... B44F 1/04; B44F 9/10; G02B 5/045; G02B 5/1861; G02B 5/18; B44C 5/0453
See application file for complete search history.

(56) References Cited

U.S. PATENT DOCUMENTS 4,033,059 A  * 7/1977 Hutton .................. B41M 3/148
                                                      101/150
7,440,153 B2 * 10/2008 Lee ...................... G02B 6/0038
                                                        359/15

(Continued)

FOREIGN PATENT DOCUMENTS

JP  2004347828 A2  12/2004
JP  2008130368 A2  6/2008
(Continued)

OTHER PUBLICATIONS

Examiner provided machine translation of Korechika Koji et al., JP 2009131998 A (Year: 2009).*
(Continued)

*Primary Examiner* — William R Alexander
*Assistant Examiner* — Balram T Parbadia
(74) *Attorney, Agent, or Firm* — Rankin, Hill & Clark LLP

(57) ABSTRACT

A resin molding is provided. The resin molding includes an optically transparent plate-shaped portion which consists essentially of a single material and which includes a first surface having a smooth surface portion, and a second surface having plural convex portions. Each of the plural convex portions includes a first inclined surface having a concavo-convex portion thereon; and a second inclined surface having a smooth surface portion. The concavo-convex portion allows at least part of light incident from the first surface to cause total reflection, diffraction and interference and to travel toward the smooth surface portion of the second inclined surface, and the smooth surface portion (Continued)

selectively reflects visible light in a predetermined wavelength range toward the first surface, so that when the first surface of the resin molding is observed from outside, the resin molding has a colored appearance with at least one color in addition to a metallic appearance.

7 Claims, 12 Drawing Sheets

(51) Int. Cl.
*B44F 9/10* (2006.01)
*G02B 5/04* (2006.01)
*B44C 5/04* (2006.01)

(56) References Cited

U.S. PATENT DOCUMENTS

| | | | | |
|---|---|---|---|---|
| 2007/0091617 | A1* | 4/2007 | Couzin | G02B 5/021 |
| | | | | 362/341 |
| 2007/0128748 | A1* | 6/2007 | Leung Ki | G03F 7/0017 |
| | | | | 438/29 |
| 2007/0236938 | A1* | 10/2007 | Ouderkirk | G02B 5/0236 |
| | | | | 362/339 |
| 2012/0067402 | A1* | 3/2012 | Kitai | E06B 9/24 |
| | | | | 136/246 |
| 2016/0178916 | A1 | 6/2016 | Kakinuma | |

FOREIGN PATENT DOCUMENTS

| | | | |
|---|---|---|---|
| JP | 4748470 | B2 | 8/2011 |
| JP | 5351412 | B2 | 11/2013 |
| JP | 2015132721 | A2 | 7/2015 |
| JP | 5798233 | B1 | 10/2015 |

OTHER PUBLICATIONS

International Search Report dated Feb. 7, 2017 filed in PCT/JP2016/086472.

Japanese Notification of Reasons for Refusal dated Jan. 27, 2017 for the corresponding Japanese Patent Application No. 2015-241654.

* cited by examiner

PROTECTIVE LAYER, ANTIREFLECTIVE LAYER OR THE LIKE

ENLARGED VIEW OF THE CIRCLED PORTION

RESIN MOLDING

BACKGROUND

Technical Field

This disclosure relates to a resin molding (i.e., molded resin article) which has a metallic appearance.

Description of the Related Art

Since resin can be molded so as to have a desired shape, resin is used for a variety of daily necessities. By imparting a metallic color (i.e., metallic appearance) to such a resin molding, the resin molding looks high-class, and therefore the commercial value thereof can be enhanced.

Japanese patents Nos. 4,748,470 and 5,798,233 have disclosed techniques of imparting a metallic appearance to a resin molding (i.e., techniques of decorating a resin molding).

In addition, Japanese patent No. 5,351,412 discloses a panel for decorative purpose in which a diffraction grating capable of forming a decorative pattern is formed on the entire surface of a concave reflection surface with a constant pitch.

However, the technique disclosed by Japanese patent No. 4,748,470 relates to a decorative resin molding which has on the surface thereof a vapor-deposited film including two or more kinds of metals as main components, and therefore it is necessary to use two or more kinds of metal materials in addition to the resin material used for the resin molding for producing the decorative resin molding. In addition, since it is necessary for the technique to perform a deposition process, the production process is complicated and the production costs increase.

The technique disclosed by Japanese patent No. 5,798,233 dissolves the problems of the technique disclosed by Japanese patent No. 4,748,470, and imparts a metallic appearance to a resin molding by utilizing total reflection. Needless to say, if such a resin molding can have an appearance with a variety of colors in addition to the metallic appearance, the commercial value thereof can be enhanced.

In contrast, the panel disclosed by Japanese patent No. 5,351,412 has a diffraction grating capable of forming a decorative pattern. However, the panel has a structure such that light diffracted by the diffraction grating is directly returned to an observer, and therefore the direction of incoming light (incident light) is largely different from the direction of outgoing light (emitted light), namely, the color largely changes depending on the observation angle. In addition, since a diffraction grating is formed on the entire surface of a concave reflection surface, only a part of diffracted light can be used. Further, the panel does not have a metallic appearance.

For these reasons, we recognize that there is a need for a decorative resin molding which has a colored appearance with at least one color in addition to a metallic appearance and which can be produced without complicating the production process while preventing increase of production costs.

SUMMARY

As an aspect of the present invention, a resin molding including an optically transparent plate-shaped portion which consists essentially of a single material and which has a first surface having a smooth surface portion and a second surface having plural convex portions is provided, wherein when the first surface of the resin molding is observed from outside, the resin molding has a metallic appearance. Each of the plural convex portions has a first inclined surface having a microscopic concavo-convex portion thereon and a second inclined surface having a smooth surface portion. In this regard, the concavo-convex portion of the first inclined surface allows at least part of light incident from the first surface to cause total reflection while causing diffraction and interference and to travel toward the smooth surface portion of the second inclined surface, and the smooth surface portion of the second inclined surface selectively reflects visible light having a predetermined wavelength toward the first surface. Therefore, when the first surface of the resin molding is observed from outside, the resin molding has a colored appearance with at least one color in addition to the metallic appearance.

DETAILED DESCRIPTION

Figure 1:
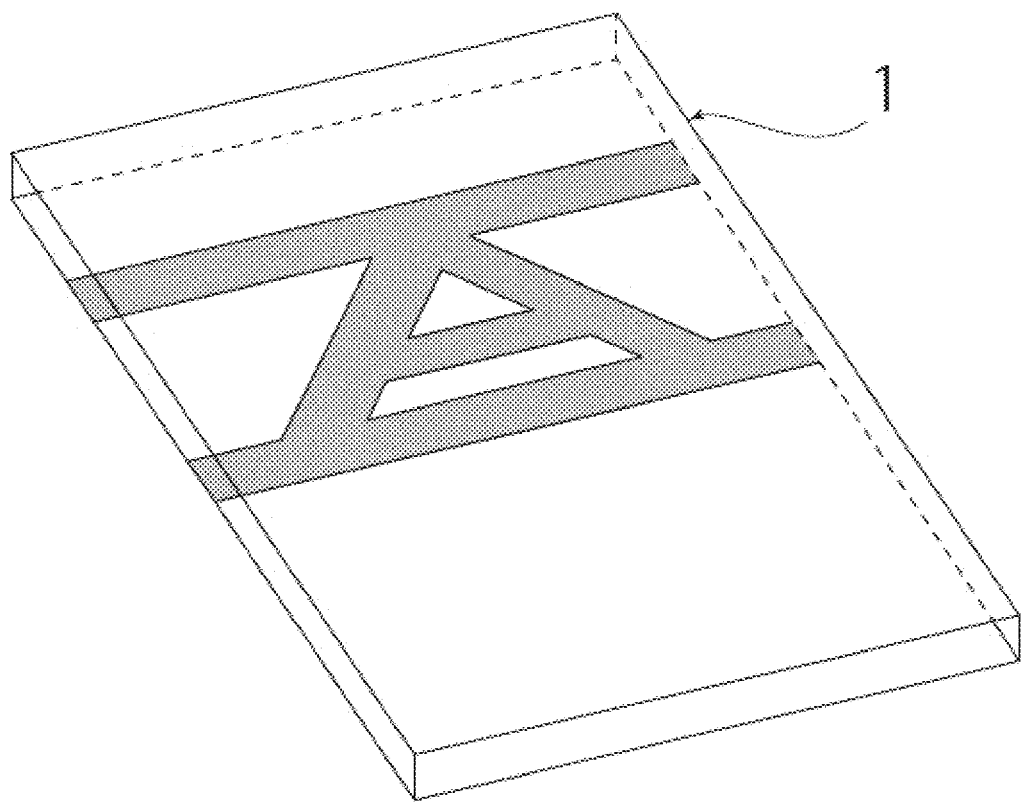
FIG. 1 is a schematic view illustrating a decorative resin molding according to an embodiment of the present invention.

The purpose of the present invention is to provide a decorative resin molding which has a colored appearance with at least one color in addition to a metallic appearance and which can be produced without complicating the production process while preventing increase of production costs.

The resin molding of the present invention includes an optically transparent plate-shaped portion which consists essentially of a single material and which has a first surface having a smooth surface portion and a second surface having plural convex portions, wherein when the first surface of the resin molding is observed from outside, the resin molding has a metallic appearance. Each of the plural convex portions has a first inclined surface having a microscopic concavo-convex portion thereon and a second inclined surface having a smooth surface portion. In this regard, the concavo-convex portion of the first inclined surface allows at least part of light incident from the first surface to cause total reflection while causing diffraction and interference and to travel toward the smooth surface portion of the second inclined surface, and the smooth surface portion of the second inclined surface selectively reflects visible light having a predetermined wavelength toward the first surface. Therefore, when the first surface of the resin molding is observed from outside, the resin molding has a colored appearance with at least one color in addition to the metallic appearance.

In the resin molding of the present invention, the first inclined surface having the microscopic concavo-convex portion thereon can be a diffraction grating having a saw blade shape.

In addition, in the resin molding of the present invention, the plural convex portions of the second surface can include at least one convex portion having a property such that the microscopic concavo-convex portion of the first inclined surface thereof is different from the microscopic concavo-convex portion of the first inclined surfaces of the other convex portions in at least one of properties selected from diffraction plane angle, total reflection plane angle and groove angle.

Further, in the resin molding of the present invention, at least one of the first surface and the second surface can be a curved surface.

Furthermore, in the resin molding of the present invention, the first inclined surface having the microscopic concavo-convex portion thereon can include a smooth transparent portion having a shape such as characters, figures, signs or the like (hereinafter these are sometimes referred to as patterns) so that the transparent portion can display one or more of the patterns. Alternatively, the portion of the first inclined surface having the microscopic concavo-convex portion may have a shape such as the patterns mentioned above so that the portion can display one or more of the patterns due to total reflection at the microscopic concavo-convex portion.

Hereinafter embodiments of the present invention will be described in detail by reference to drawings. However, the present invention is not limited to the embodiments and examples mentioned below, and embodiments and examples other than those mentioned below are possible in the present invention. In the following description, convex portions, concave portions and grooves of a surface of the resin molding respectively mean convex portions, concave portions and grooves of the surface when the surface is observed from the side of the second side 3 of the resin molding.

Figure 2:
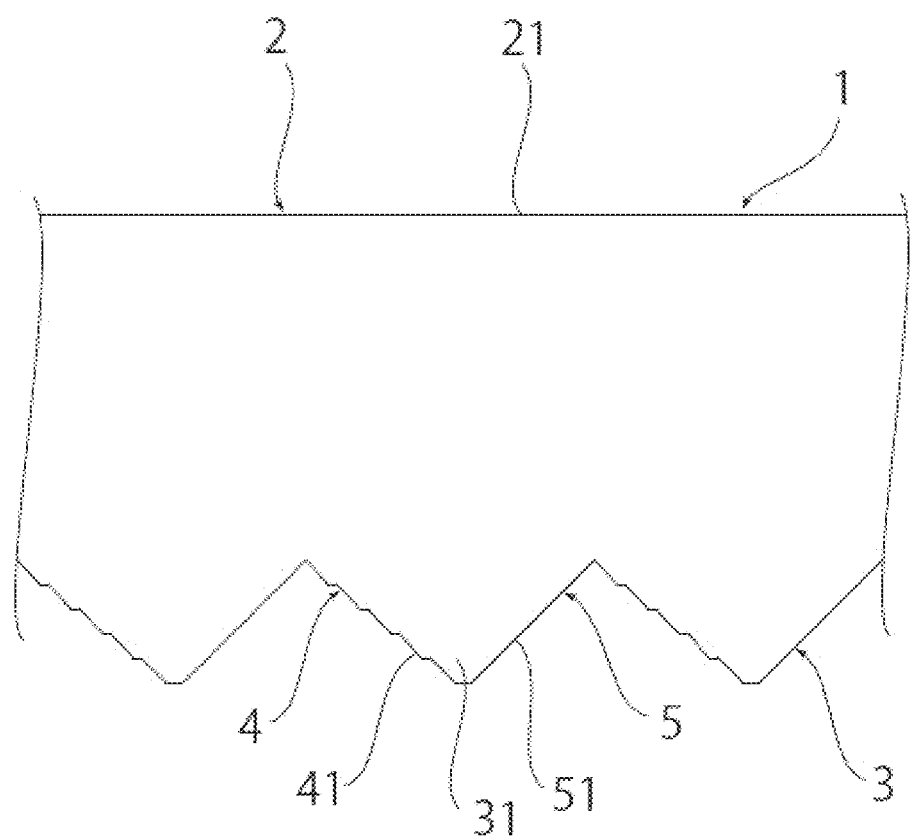
FIG. 2 is a cross-sectional view illustrating the decorative resin molding.

FIG. 1 is a schematic view illustrating a decorative resin molding 1 (hereinafter sometimes referred to molding 1) according to an embodiment of the present invention. FIG. 2 is a schematic cross-sectional view of a plate-shaped portion of the molding 1.

Specifically, the molding 1 is a resin molding which includes an optically transparent plate-shaped portion consisting essentially of a single material and which can have a metallic appearance. The molding 1 includes a first surface 2 having a smooth surface 21, and a second surface 3 on which plural convex portions 31 are formed.

In the molding 1, each of the convex portions 31 has a first inclined surface 4 having a microscopic concavo-convex portion 41 (hereinafter referred to as a concavo-convex portion 41), and a second inclined surface 5 having a smooth surface portion 51.

In the molding 1, at least part of light incident from the first surface 2 causes total reflection at the concavo-convex portion 41 of the first inclined surface 4 while causing diffraction and interference so as to travel toward the smooth surface portion 51 of the second inclined surface 5. In this regard, visible light which has a predetermined wavelength range and which is included in the incident light is selectively reflected on the smooth surface portion 51 of the second inclined surface 5 so as to travel toward the first surface 2, followed by exiting from the first surface 2. Therefore, when the first surface 2 of the molding 1 is observed from outside, the molding 1 has a colored appearance with at least one color in addition to a metallic appearance. In this regard, the term "metallic appearance" means that the molding 1 looks as if the molding has a metallic coating thereon when observed by an observer.

Suitable materials for use as the main component of the molding 1 include resins, i.e., polymers which are optically transparent and which can be processed or molded to have desired shapes. Specific examples of the resins include thermoplastic resins such as polycarbonate (PC), polyethylene (PE), polypropylene (PP), polyvinyl chloride (PVC), polyester (such as polyethylene terephthalate (PET)), acrylic resins (such as polymethyl methacrylate (PMMA)), cycloolefin polymers (COP), cycloolefin copolymers (COC), acrylonitrile-styrene resins (AS), and acrylonitrile-butadiene-styrene resins (ABS); thermosetting resins such as phenolic resins, polyurethane, and thermosetting polyimide; and photocrosslinkable resins, but are not limited thereto as long as the resins have a desired refractive index. The resins used for the molding 1 may have any one of states including a colorless and transparent state, a colorless and semi-transparent state, a colored and transparent state, and a colored and semi-transparent state.

The molding 1 consists essentially of a single material, and therefore it becomes possible to produce the molding 1, which has a colored appearance with at least one color in addition to a metallic appearance, without performing a complex process.

Figure 3:
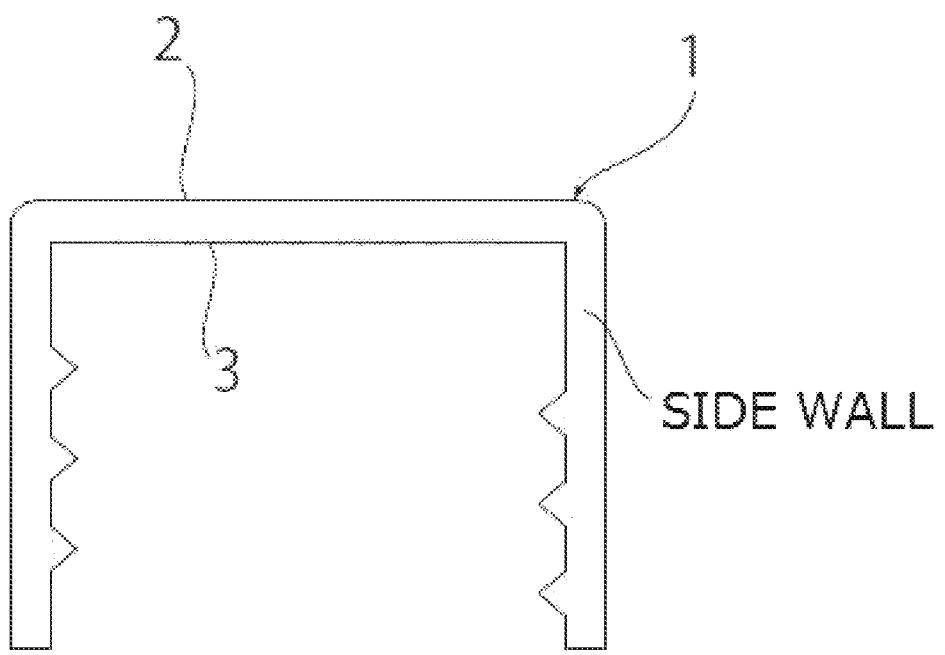
FIG. 3 is a schematic view illustrating an example for which the decorative resin molding is used.

As mentioned above, the second surface 3 of the plate-shaped portion of the molding 1 has the plural convex portions 31. The plate-shaped portion of the molding 1 is not necessarily a parallel plate in which the first surface 2 and the second surface 3 are parallel to each other, and it is possible for the plate-shaped portion that at least one of the first surface 2 and the second surface 3 is a curved surface. For example, as illustrated in FIG. 3, the molding 1 can be used as a cap of a container such as drink containers and cosmetic containers. In addition, the molding 1 can be used for various goods such as static parts such as emblems to be attached to mechanical devices (such as cars), and dynamic parts such as clock hands.

In the molding 1, the resin constituting the molding has optical transparency. In this regard, the term "optical transparency" means a property such that at least part of incident light passes through the molding. The transparency of a portion of the plate-shaped portion of the molding 1 on which no convex portion is formed and which is present in the vicinity of a convex portion is preferably higher than 0% and not higher than 60%, and more preferably not lower than 5% and not higher than 50%, against light having a wavelength of 633 nm, but is not limited thereto. When the transparency is higher than 0%, it is possible for incident light to travel in the resin and to be reflected therein while causing diffraction and interference, and therefore the molding 1 can give a metallic appearance and a colored appearance with at least one color to observers. In this regard, when the transparency is not lower than 5%, this effect can be further enhanced. When the transparency is not higher than 60%, the degree of the metallic appearance can be enhanced, resulting in enhancement of beauty, and when the transparency is not higher than 50%, this effect can be further enhanced.

As mentioned above, the molding 1 has the first surface 2 on which the smooth surface 21 is formed. In the molding 1, light enters from the first surface 2 and travels in the resin. In this regard, at least part of incident light causes diffraction, interference and total reflection in the resin, and then exits from the first surface 2. Therefore, the molding 1 can give a metallic appearance and a colored appearance with at least one color to observers. In this regard, the smooth surface 21 of the first surface 2 does not have a concavo-convex portion, which scatters light, unlike the convex portions 31 of the second surface 3, and has a smoothness similar to that of a mirror surface.

As mentioned above, the molding 1 has the second surface 3 on which the plural convex portions 31 are formed. Since the molding 1 has the plural convex portions 31, concavity and convexity are regularly repeated on the second surface 31, and therefore incident light causes diffraction, interference and reflection at each of the concavities and convexities. Therefore, a large amount of light can be secured, thereby making it possible that the molding 1 has an intense metallic appearance and a colored appearance with at least one color.

It is possible for the molding 1 to have a structure such that a smooth transparent portion having a shape such as the patterns mentioned above is arranged in the area of the concavo-convex portion 41 so that the transparent portion looks like the pattern (i.e., the molding 1 shows an image of the pattern). In addition, it is also possible for the molding 1 to have a structure such that the area of the concavo-convex portion 41 has a shape such as the patterns mentioned above so that the molding 1 shows an image of the pattern due to total reflection at the concavo-convex portion 41.

Figure 4:
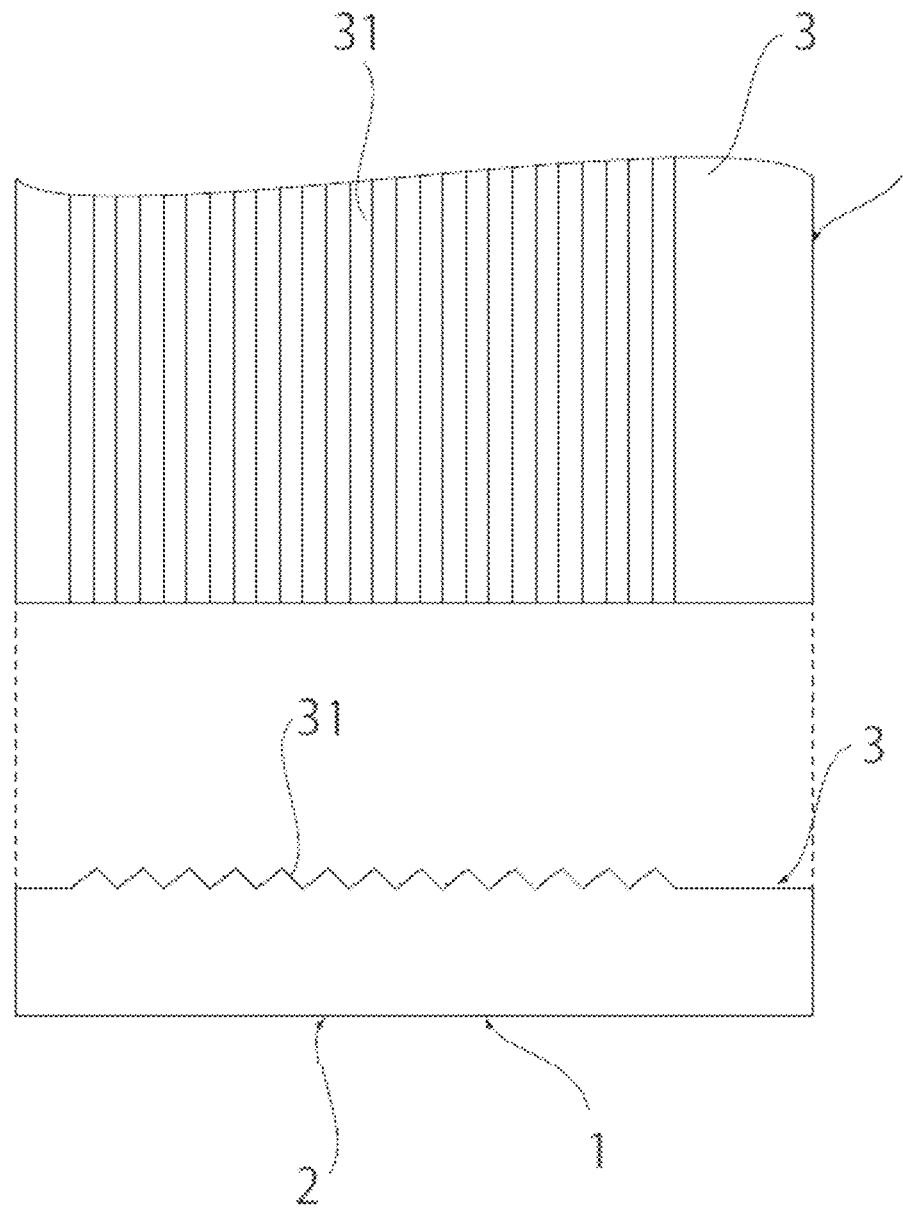
FIG. 4 illustrates an example of convex portions and grooves of the second surface.
Figure 5:
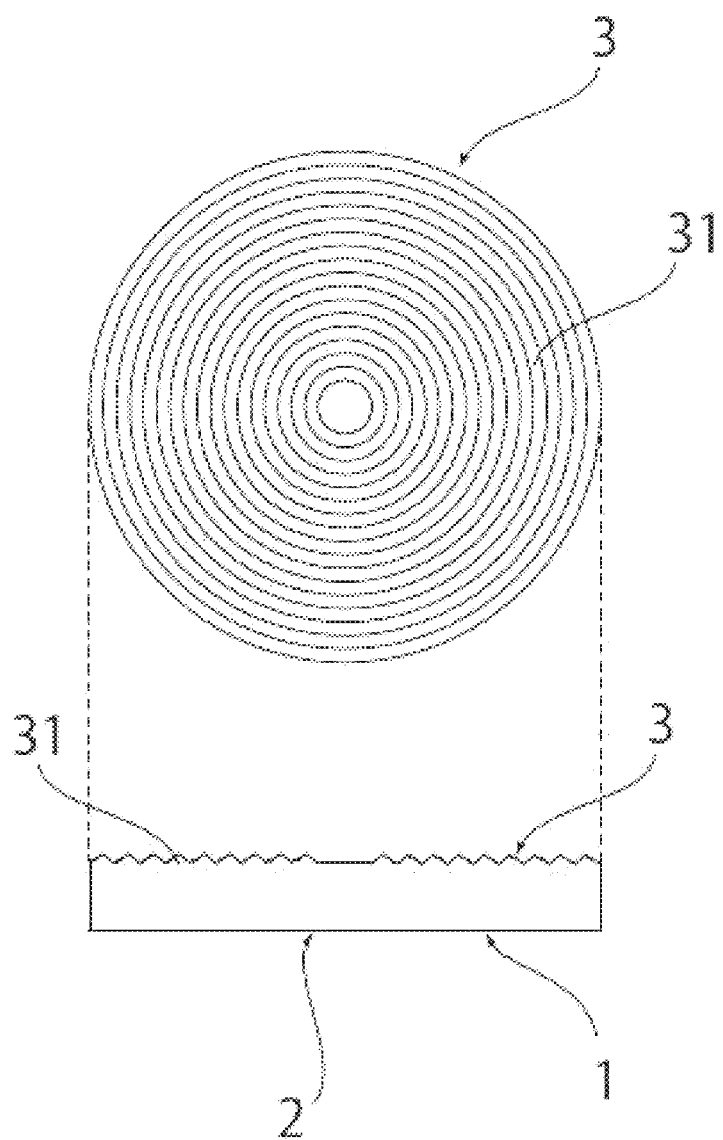
FIG. 5 illustrates another example of convex portions and grooves of the second surface.

The shape of the plural convex portions 31 is not particularly limited as long as the convex portions have an orderly structure. For example, the convex portions 31 can have a structure such that liner convex portions are arranged in parallel as illustrated in FIG. 4, or a structure such that circular convex portions are concentrically arranged as illustrated in FIG. 5.

As mentioned above, each of the convex portions 31 has the first inclined surface 4 on which the concavo-convex portion 41 is formed and the second inclined surface 5 having the smooth surface portion 51.

As mentioned above, the second inclined surface 5 has the smooth surface portion 51. In this regard, the meaning of the term "smooth" of the smooth surface 51 is the same as that of the smooth surface 21 mentioned above.

The concavo-convex portion 41 is formed on the first inclined surface 4. Since the molding 1 has the concavo-convex portion 41, visible light which has a predetermined wavelength range and which is included in the incident light causes total reflection while causing diffraction and interference at the concavo-convex portion 41, and therefore the resin molding 1 can have a colored appearance with at least one color in addition to a metallic appearance.

The shape of the concavo-convex portion 41 is not particularly limited as long as the concavo-convex portion 41 has the functions mentioned above. However, it is preferable for the concavo-convex portion 41 to have a structure such that a portion causing total reflection is regularly arranged, and it is more preferable that the concavo-convex portion is a diffraction grating having a saw blade shape. The cross-sectional view of an example of the concavo-convex portion 41 is illustrated in FIG. 6.

Next, the function of the molding 1 will be described in detail by reference to FIG. 6. In order to simplify the description, a horizontal plane H defined as a surface parallel to the smooth surface 21 of the plate-shaped portion of the molding 1 is illustrated in FIG. 6. In addition, in the description, the molding is observed from a direction perpendicular to the horizontal plane H (i.e., the observation angle is perpendicular to the horizontal plane H), and the light incident angle is perpendicular to the horizontal plane H. However, needless to say, the geometric structure of the molding 1 is not limited to the structure and can be properly adjusted as long as the function of the molding 1 can be fulfilled.

Figure 6:
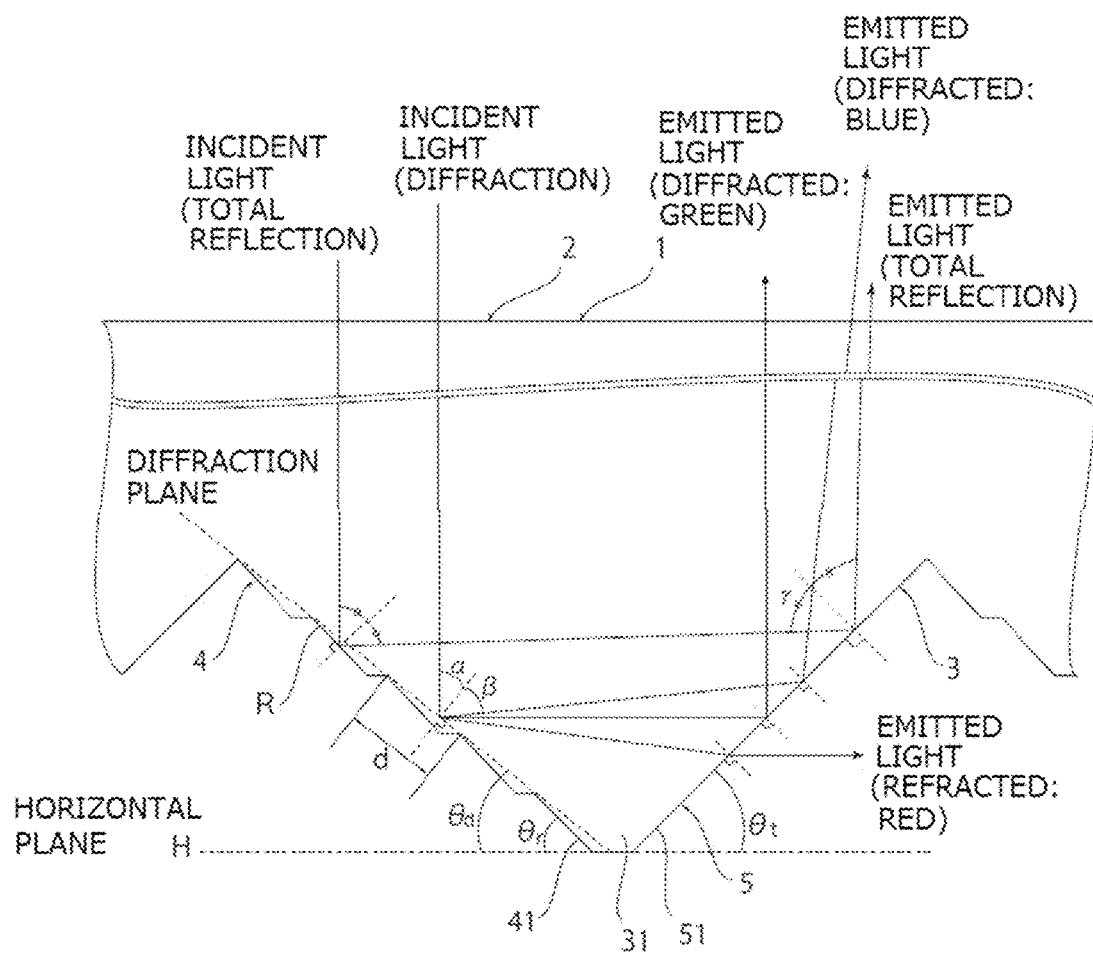
FIG. 6 is a detailed cross-sectional view illustrating the decorative resin molding while illustrating a concavo-convex portion on a first inclined surface of the convex portions.

As illustrated in FIG. 6, the concavo-convex portion 41 of the first inclined surface 4 has a saw blade shape and has a total reflection portion R which is a basic part of the concavo-convex portion 41 and which is arranged with a predetermined pitch d. In FIG. 6, a diffraction plane D is defined as a plane formed by connecting the bottoms of the concavo-convex portion 41. In addition, it is also defined that the angle (hereinafter referred to a diffraction plane angle) formed by the horizontal plane H and the diffraction plane D is θd, the angle (hereinafter referred to a groove angle) formed by the horizontal plane H and the total reflection portion R is θr, and the angle (hereinafter referred to as a total reflection surface angle) formed by the horizontal plane H and the smooth surface 51 of the second inclined surface 5 is θt. Further, it is defined that the refractive index of the resin constituting the molding 1 is n1 and the refractive index of the material (such as air) surrounding the molding is n2, wherein n1 is greater than n2 (i.e., n1>n2).

As mentioned above, it is assumed that an observer observes the molding 1 from a direction perpendicular to the horizontal plane H, and light is incident from the direction perpendicular to the horizontal plane H. In this regard, the incident light is visible light (i.e., white light) including light of different wavelengths.

Referring to FIG. 6, light incident from the first surface 2 travels inside the molding 1, and reaches a convex portion of the concavo-convex portion 41 of the first inclined surface 4. Next, the incident light causes total reflection at the total reflection portion R, and changes the travelling direction so as to travel toward the smooth surface 51 of the second inclined surface 5. In this regard, the groove angle θr at the total reflection portion R satisfies the following equation (1):

$$\sin \theta r \geq n2/n1, \text{ namely,}$$

$$\theta r \geq \arcsin(n2/n1) \text{ [degree]} \quad (1).$$

The light travelling toward the smooth surface 51 of the second inclined surface 5 causes total reflection at the smooth surface 51, and travels toward the first surface 2. In this case, the diffraction plane angle θd satisfies the following equation (2):

$$\gamma \geq \arcsin(n2/n1) \text{ [degree]} \quad (2),$$

wherein γ represents an angle formed by the light incident to the smooth surface 51 and the normal line to the smooth surface 51.

Since the angle γ is the angle of the light after the light causes total reflection at the first inclined surface 4, the angle can be calculated. Specifically, the angle γ is represented by the following equation:

$$\gamma = 180 - \theta t - 2\theta r \text{ [degree]} \qquad (3).$$

Substitution of equation (3) into equation (2) yields the following equation:

$$180 - \theta t - 2\theta \geq \arcsin(n2/n1) \text{ [degree]} \qquad (2)'.$$

As a result, light incident from the first surface 2 is emitted from the first surface 2 after causing total reflection twice. In this regard, the angle of light emitted from the first surface 2 is preferably close to a right angle against the horizontal plane H. Specifically, it is more referable to control the parameters of the molding 1 so that the angle of light emitted from the first surface 2 against the horizontal plane H falls in a range of from (90°−θ) to (90+θ), wherein θ is from 5° to 10°.

In addition, when light incident from the first surface 2 and travelling inside the molding 1 reaches the concavo-convex portion 41 of the first inclined surface 4 of the convex portion 31, the light causes diffraction and interference which change depending on the wavelength of the light and the diffraction structure of the concavo-convex portion 41, followed by travelling inside the convex portion 31 while having a diffraction angle β which changes depending on the wavelength of the light. In this regard, the diffraction angle β satisfies the following equation:

$$d(\sin \beta - \sin \alpha) = m\beta \qquad (4),$$

wherein d represents the above-mentioned pitch of the total reflection portion R, α represents the angle formed by the normal line to the diffraction plane D and the incident light, m is a positive integer, and λ represents the wavelength of the incident light.

In the example of the molding 1 illustrated in FIG. 6, light having a wavelength in the red wavelength region causes diffraction and interference at a relatively large diffraction angle, light having a wavelength in the blue wavelength region causes diffraction and interference at a relatively small diffraction angle, and light having a wavelength in the green wavelength region causes diffraction and interference at an intermediate diffraction angle therebetween.

The light thus causing diffraction and interference is then incident on the smooth surface 51 of the second inclined surface 5. In this regard, since light causing diffraction and interference at a relatively large diffraction angle (i.e., red light in the above example) does not satisfy the total reflection angle (i.e., requirements of total reflection), the light is emitted from the second inclined surface 5 of the convex portion 31 instead of the first surface 2 while being refracted. As a result, light satisfying the requirements of total reflection such as light in the blue wavelength region and light in the green wavelength region in the above example causes total reflection and is emitted from the first surface 2. As a result, observers can observe the light which is emitted from the first surface 2, wherein light in the red wavelength region is excluded therefrom.

More specifically, the incident light angle α, the diffraction plane angle θd, and the total reflection surface angle θt satisfy the following equation:

$$(\theta d + \theta t) - \arcsin(\sin \alpha + m\lambda/d) \geq \arcsin(n2/n1) \text{ [degree]} \qquad (5).$$

Thus, by adjusting the parameters including the diffractive index n1 of the molding 1, the diffractive index n2 of the medium contacting the molding 1, the pitch d, the diffraction plane angle θd, and the total reflection surface angle θt, light incident from the first surface 2 and having a wavelength in the desired wavelength region can be almost emitted from the first surface 2 while light having a wavelength outside the desired wavelength region is almost emitted from the second surface 3. Therefore, it becomes possible for the molding 1 to have a colored appearance with the desired color. Particularly, since selection of light is performed based on diffraction and interference in addition to total reflection, strong diffracted light and strong interfering light can be obtained because the light causing total reflection is strong. Specifically, when it is desired that the molding has a bluish metallic appearance, it is preferable that the following equation (6) is satisfied:

$$(d/m)(\sin((\theta d + \theta t) - \arcsin(n2/n1)) - \sin \alpha) \geq 550 \qquad (6),$$

wherein it is assumed that the central wavelength of the light in the green wavelength region is 550 nm.

In the molding 1, the size of each of the convex portions 31 and the concavo-convex portion 41 is not particularly limited and can be properly adjusted as long as the above-mentioned conditions are satisfied. For example, in order that the convex portion 31 satisfactorily causes diffraction, interference and reflection, the width of the convex portion 31 is preferably from 10 μm to 200 μm, and more preferably from 20 μm to 100 μm. When the width of the convex portion 31 is not greater than 200 μm, observers can hardly recognize the groove formed by the convex portions because the resolution power of human eyes is too low to recognize such a groove. When the width of the convex portion 31 is not greater than 100 μm, the effect can be further enhanced. In addition, when the width is not less than 10 μm, the concavo-convex portion 41 can be clearly formed with desired pitches.

In addition, the height of the convex portion 31 is not particularly limited as long as the convex portion 31 satisfactorily causes diffraction, interference and reflection of light. However, for the same reason as that mentioned above with respect to the width of the convex portion 31, the height of the convex portion 31 is preferably from 10 μm to 200 μm, and more preferably from 20 μm to 100 μm.

Further, the pitch d with which the concavo-convex portions 41 are arranged on the second inclined surface 4 is not particularly limited and can be properly adjusted as long as the above-mentioned diffraction conditions are satisfied. However, the pitch d is preferably from 0.1 μm to 2 μm.

In the resin molding, the plural convex portions can include at least one convex portion having a property such that the microscopic concavo-convex portion of the first inclined surface thereof is different from the microscopic concavo-convex portion of the first inclined surfaces of the other convex portions in at least one of properties selected from diffraction plane angle, total reflection plane angle and groove angle.

Figure 7:
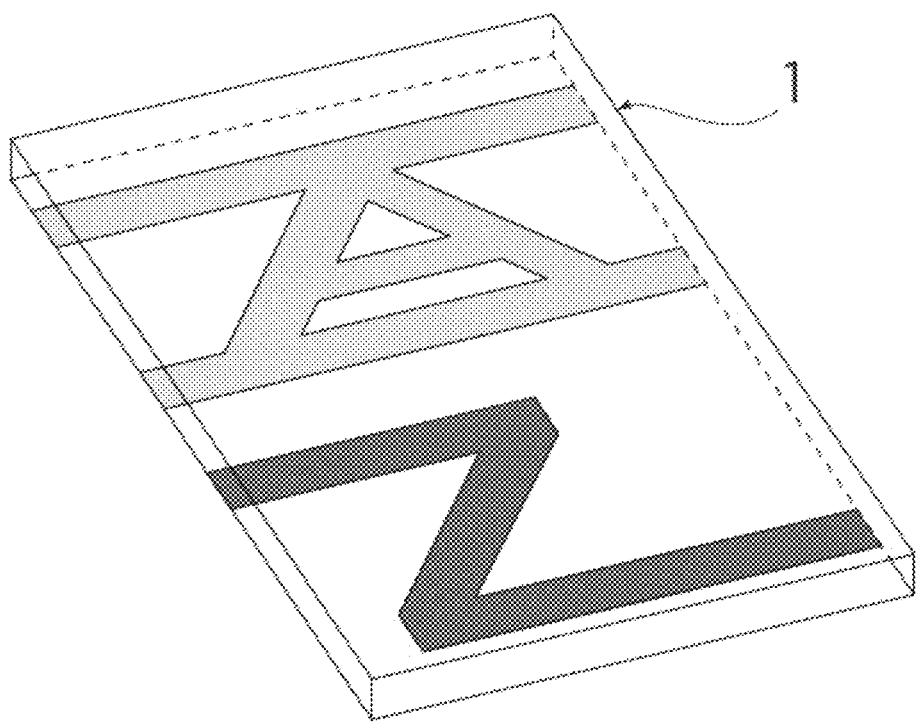
FIG. 7 illustrates an example color image displayed by the decorative resin molding when the resin molding is observed from outside.

Hereinbefore, description has been performed by reference to one microscopic concavo-convex portion illustrated in FIG. 6 in order to simplify the description. However, the same phenomena occur at each of the microscopic concavo-convex portions. Needless to say, the angles mentioned above with respect to the microscopic concavo-convex portion can be properly adjusted. _Specifically, it is possible that at least one of the diffraction plane angle, the total reflection surface angle and the groove angle of at least one of the plural microscopic concavo-convex portions 41 is different from that of others of the plural microscopic concavo-convex portions 41. More specifically, by changing at least one of the angles of a microscopic concavo-convex portion in an area from that of a microscopic concavo-convex portion in another area, the color of the areas of the molding 1 can be changed, namely the molding 1 is capable of color displays. An example of the molding 1 displaying color images is illustrated in FIG. 7.

Figure 8:
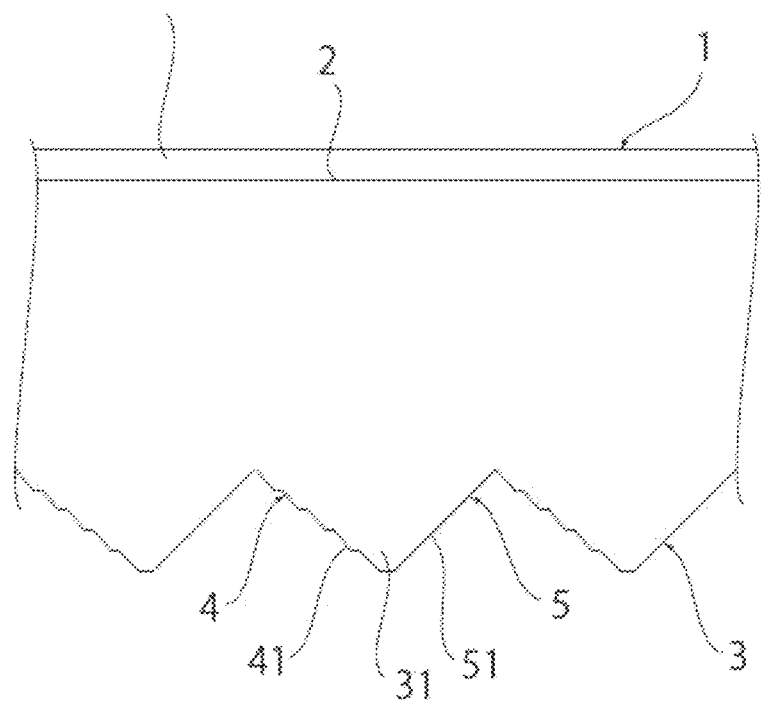
FIG. 8 is a schematic cross-sectional view illustrating a decorative resin molding according to another embodiment of the present invention which has a protective layer on the first surface thereof.
Figure 9:
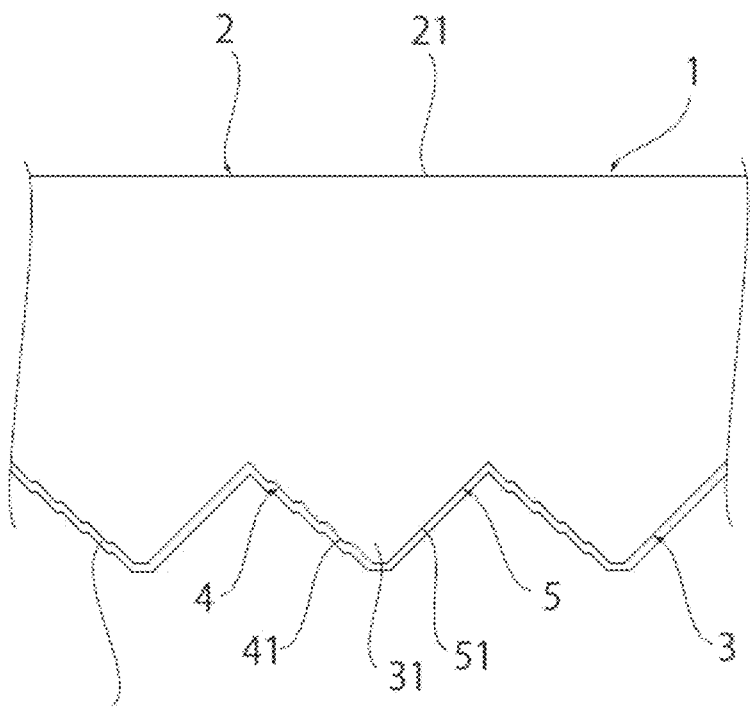
FIG. 9 is a schematic cross-sectional view illustrating a decorative resin molding according to yet another embodiment of the present invention which has a protective layer on the convex portions and grooves of the second surface thereof.

If desired, it is possible for the molding 1 that at least one of the first surface 2 and the second surface 3 has thereon a protective layer or an antireflective layer. FIG. 8 illustrates an example of the molding 1 having a protective layer or an antireflective layer on the first surface 2, and FIG. 9 illustrates an example of the molding 1 having a protective layer or an antireflective layer on the second surface 3.

Figure 10:
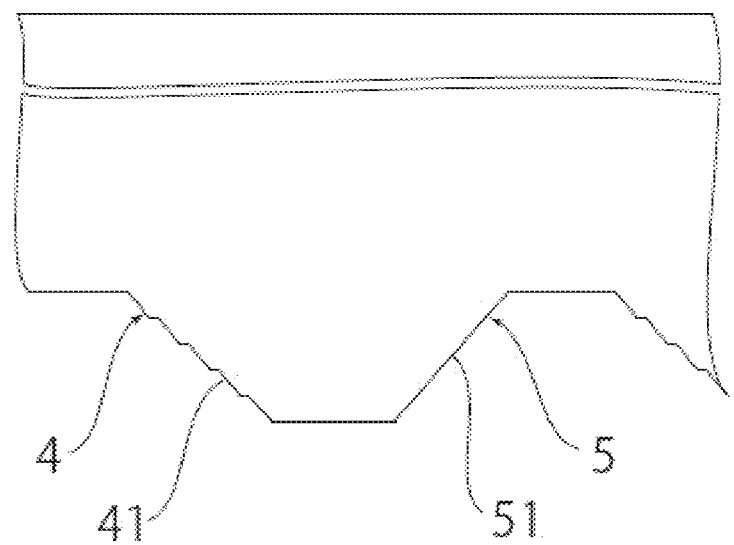
FIG. 10 illustrates another example of the convex portions on the second surface.

The shape of the convex portions 31 of the molding 1 is not particularly limited as long as the convex portions 31 have the first inclined surface and the second inclined surface. Specifically, the convex portions 31 of the molding 1 illustrated in FIG. 2 have a shape similar to triangular shape in which the top thereof is sharp. However, as illustrated in FIG. 10, the convex portions 31 may have a shape similar to trapezoid in which the top thereof is flat. In addition, the convex portions 31 illustrated in FIG. 2 are arranged side by side without a space therebetween, but the convex portions 31 can be arranged side by side with a space therebetween.

Figure 11:
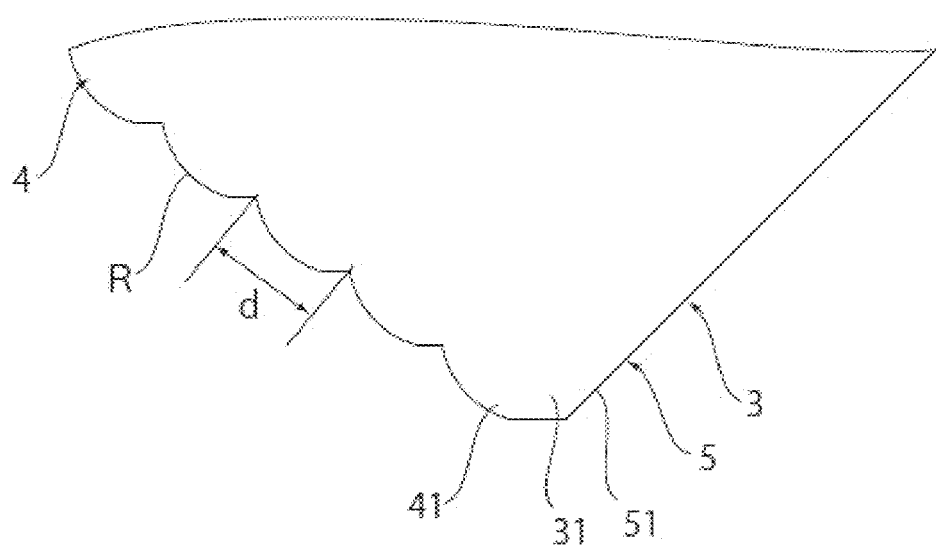
FIG. 11 illustrates yet another example of the concavo-convex portion on the first inclined surface.

In the molding 1, the total reflection portion R of the concavo-convex portion 41 preferably has a flat surface, but may have a convex surface or a concave surface. FIG. 11 illustrates an example of the convex portion 31 in which the total reflection portion R has a convex surface. When the total reflection portion R has a flat surface, the flat surface preferably has smoothness similar to that of the smooth surface 21 of the first surface 2.

As mentioned above, a decorative rein molding which has a metallic appearance with various colors and which can be produced without complicating the production process while preventing increase of production costs can be provided by the present invention. Specifically, by forming microscopic a concavo-convex portion capable of causing total reflection, diffraction and interference on one side of a convex portion of the second surface of the resin molding, total reflection of incident light is caused at the concavo-convex portion while diffraction and interference are caused. Thereafter, light with specific wavelengths of primary diffraction light which has caused diffraction and interference at the concavo-convex portion causes total reflection at the other side of the convex portion so as to travel to the first surface and to emit from the first surface, while part of the primary diffraction light which has changed traveling angle as a result of the diffraction and interference is emitted from the second surface without causing total reflection at the other side of the convex portion. Therefore, it becomes possible for the molding to have a metallic appearance with a specific color when observed from outside by observers. As a result, the molding can perform multi-color display, and therefore the commercial value of the molding can be extremely enhanced.

It is clear from the above description that the molding of the present invention can have a colored appearance with at least one color in addition to a metallic appearance due to the convex portions. Therefore, it is possible for the molding that when the portion including the convex portions has a shape such as characters, figures, signs or the like (i.e., the patterns mentioned above), the molding can display the pattern. In addition, it is also possible that when a smooth portion having a shape such as the patterns mentioned above is arranged in the area of the convex portions so that the smooth portion looks like the pattern, the molding can display an outline image of the pattern.

Having generally described this invention, further understanding can be obtained by reference to certain specific examples which are provided herein for the purpose of illustration only and are not intended to be limiting.

EXAMPLES

An example of the decorative resin molding of the present invention was practically prepared to confirm the effects of the molding. Hereinafter, the example will be described in detail.

Figure 12:
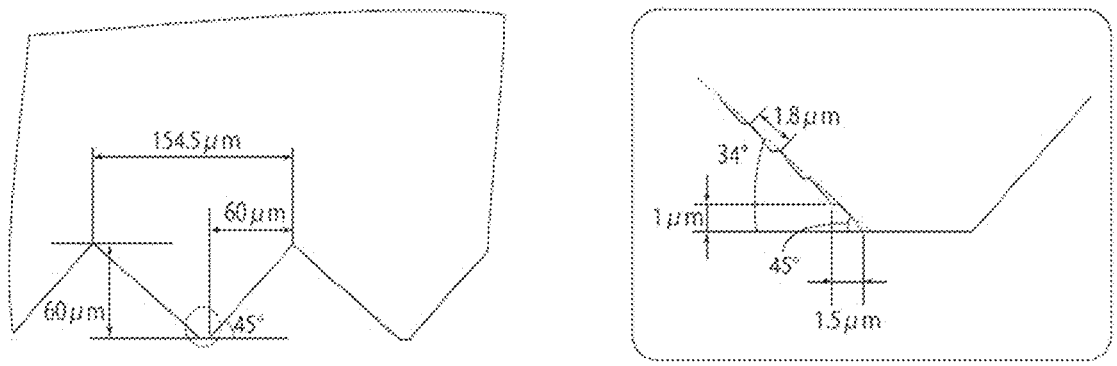
FIG. 12 illustrates sizes of an example of the decorative resin molding of the present invention.

Plural convex portions each having such a size as illustrated in FIG. 12 were formed on one surface of an acrylic plate which has a thickness of 0.8 mm and which has two flat surfaces. Each of the convex portions has the above-mentioned first inclined surface having a microscopic concavo-convex portion thereon and the above-mentioned second inclined surface having a smooth surface portion. The concavo-convex portion has a total reflection portion causing total reflection while having a step-like shape with a predetermined pitch. As a result of an experiment using visible light, it was confirmed that the example has a bluish metallic appearance. In addition, it was also confirmed that another example prepared by the same method as mentioned above except that a cycloolefin polymer (COP) is used instead of the acrylic resin can also produce the same effects.

Thus, it was confirmed that the effects of the present invention can be produced by the above-mentioned resin molding examples, which were really prepared.

INDUSTRIAL AVAILABILITY OF THE PRESENT INVENTION

The decorative resin molding of the present invention and the method for producing the molding have good industrial availability.

EFFECT OF THE PRESENT INVENTION

The present invention can provide a decorative resin molding which has a colored appearance with at least one color in addition to a metallic appearance and which can be produced without complicating the production process while preventing increase of production costs.

What is claimed is:

1. A resin molding comprising:
an optically transparent plate-shaped portion consisting essentially of a single material,
wherein the plate-shaped portion includes:
a first surface having a smooth surface portion, and
a second surface having plural convex portions thereon,
wherein each of the plural convex portions includes:
a first inclined surface having a concavo-convex portion thereon, the concavo-convex portion comprising a total reflection portion which is arranged with a predetermined pitch; and
a second inclined surface having a smooth surface portion,
wherein a part of a light incident from the first surface is totally reflected, by the total reflection portion of the concavo-convex portion of the first inclined surface, toward the smooth surface portion of the second inclined surface and then totally reflected by the smooth surface portion of the second inclined surface while the predetermined pitch causes diffraction and interference of another part of the light incident from the first surface, and the smooth surface portion of the second inclined surface selectively reflects visible light in a predetermined wavelength range toward the first surface, so that when the first surface of the resin molding is observed from outside, the resin molding has a colored appearance with at least one color in addition to a metallic appearance.

2. The resin molding according to claim 1, wherein the concavo-convex portion includes a diffraction grating having a saw blade shape.

3. The resin molding according to claim 1, wherein the plural convex portions include at least one convex portion having a property such that the concavo-convex portion of the first inclined surface thereof is different from the concavo-convex portion of the first inclined surfaces of the other convex portions in at least one of properties selected from diffraction plane angle, total reflection plane angle and groove angle.

4. The resin molding according to claim 1, wherein at least one of the first surface and the second surface is a curved surface.

5. The resin molding according to claim 1, wherein the first inclined surface includes a smooth transparent portion having a shape of pattern selected from characters, figures and signs so that the transparent portion displays an image of the pattern when the first surface of the resin molding is observed from outside, or a portion of the first inclined surface having the concavo-convex portion has a shape of pattern selected from characters, figures and signs so that the portion displays an image of the pattern when the first surface of the resin molding is observed from outside.

6. The resin molding according to claim 1, wherein the second inclined surface consists of the smooth surface portion.

7. The resin molding according to claim 1, wherein at least one of the plural convex portions has a shape similar to triangular shape in which a top thereof is sharp or a shape similar to trapezoid in which a top thereof is flat, the first inclined surface is one side of the shape similar to triangular shape or the shape similar to trapezoid, and the second inclined surface is another one side of the shape similar to triangular shape or the shape similar to trapezoid.

* * * * *